(12) United States Patent
Wiebe

(10) Patent No.: US 6,719,200 B1
(45) Date of Patent: Apr. 13, 2004

(54) CHECKING OF RIGHT TO ACCESS

(75) Inventor: Linus Wiebe, Lund (SE)

(73) Assignee: Precise Biometrics AB, Lund (SE)

( * ) Notice: Subject to any disclaimer, the term of this patent is extended or adjusted under 35 U.S.C. 154(b) by 71 days.

(21) Appl. No.: 10/048,211

(22) PCT Filed: Jul. 11, 2000

(86) PCT No.: PCT/SE00/01472

§ 371 (c)(1),
(2), (4) Date: Jan. 30, 2002

(87) PCT Pub. No.: WO01/11577

PCT Pub. Date: Feb. 15, 2001

Related U.S. Application Data

(60) Provisional application No. 60/150,438, filed on Aug. 24, 1999.

(30) Foreign Application Priority Data

Aug. 6, 1999 (SE) ............................................. 9902846

(51) Int. Cl.⁷ ................................................. G06K 5/00
(52) U.S. Cl. ........................ 235/382; 382/124; 382/115; 356/71; 235/285.5; 340/5.1
(58) Field of Search .............................. 235/382, 382.5; 340/5.1–5.92; 382/115

(56) References Cited

U.S. PATENT DOCUMENTS

| 4,582,985 A | 4/1986 | Lofberg |
| 5,144,680 A | 9/1992 | Kobayashi et al. |
| 5,239,166 A | 8/1993 | Graves |
| 5,869,822 A | 2/1999 | Meadows, II et al. |

FOREIGN PATENT DOCUMENTS

| FR | 2 587 522 A1 | 3/1987 |
| SE | 8101707-1 | 3/1981 |
| WO | WO 98/01820 A1 | 1/1998 |
| WO | 99/51138 | 10/1999 |

*Primary Examiner*—Karl D. Frech
*Assistant Examiner*—Dan Hess
(74) *Attorney, Agent, or Firm*—Burns, Doane, Swecker & Mathis, L.L.P.

(57) ABSTRACT

A system for checking the right to access to sensitive information is described, said checking being based on current biometric data of a person whose right to access to the sensitive information is to be checked. The system comprises a data carrier and a processing unit. The data carrier comprises a memory containing sensitive information, a signal processing means and a communication means. The processing unit is adapted to receive the current biometric data from the person and comprises a memory, a signal processing means and a communication means. The process of the processing unit preprocesses the current biometric data and transfers the same to the processor of the data carrier via the communication means. The process of the data carrier compares the received preprocessed biometric data with biometric reference data stored in advance in the memory of the data carrier to determine whether the right to access to the sensitive information exists. A data carrier, a processing unit and a method of checking, based on current biometric data of a person, the right to access to sensitive information stored on a data carrier are also described.

35 Claims, 2 Drawing Sheets

CHECKING OF RIGHT TO ACCESS

This is a 35 U.S.C. §371 filing of International Application No. PCT/SE00/01472 filed Jul. 11, 2000 that designates the United States of America and was published in English, and claims the benefit of the filing of U.S. Provisional Application No. 60/150,438, filed Aug. 24, 1999 under 35 U.S.C. §119(d), and Swedish Application No. 9902846-6, filed Aug. 6, 1999 under 35 U.S.C. §119(a).

FIELD OF THE INVENTION

The present invention relates to a system for checking the right to access to sensitive information, based on biometric data, of the type stated in the preamble to appended claim 1. The invention also relates to a data carrier, a processing unit and a method of checking, based on biometric data, the right to access to sensitive information stored on a data carrier.

BACKGROUND OF THE INVENTION

The access to information, to a room or the like must in many cases be restricted to certain individuals. This is the case, for instance, when electronic money transactions occur via the Internet, when in a hospital the access to case records is to be limited, or when only certain individuals in a place of work are allowed to have access to certain information or certain rooms.

To this end, use is often made of what is referred to as intelligent cards or smart cards. A smart card can be described as a card in the size of an account card which has a built-in processor or a signal processing means, a memory and a communication interface. Sensitive information is stored on all smart cards used in the above contexts. The sensitive information consists of one or more parts. A first part of the sensitive information is a so-called template which is stored on each smart card and can be described as reference information, stored in advance, about the user of the card. It is with this reference information that a comparison is made every time the card user wishes to verify his right to use the card. The template is further the only sensitive information that need be available on the smart card if it is intended for use as a pure "key card" and to generate a "yes" or "no", for instance, for physical access to a room.

A second part of the sensitive information is available on cards that are not used as "key cards" but as more absolute information carriers. The second part of the sensitive information then consists of computer files which may contain data of the type which is mentioned by way of introduction and which only the card user may access. When the card user wants to verify that he has the right to access to the sensitive information stored in the computer files on the smart card, he places the card in a terminal and enters a PIN code (PIN=Personal Identification Number). The pin code is limited to 16 bytes and usually consists of four digits between zero and nine which are matched with the template stored on the card. If the pin code corresponds with the template, "the card is unlocked", i.e. the user gains access to the computer files containing the sensitive information. This differs from the case where the card is used as a pure "key card" and only a "yes" or a "no" is generated in response to the matching with the template.

Pin codes are presently used in many situations, and many people find it difficult to remember a number of different pin codes. Therefore, many people choose to use the same pin code in a number of different situations, thus deteriorating security. For this reason, and with a view to further increasing security, alternative solutions have been presented, in which a user instead identifies himself with the aid of biometric information. By biometric information is meant information which is body-related and individual-specific for the user and which may consist of, for instance, the pattern of the user's fingers, palm, iris, or some other information which is not related to appearance, such as the user's voice. A method in which a user identifies himself with the aid of biometric information according to prior art typically proceeds as follows:

The user places his smart card in a terminal and one finger on a sensor which generates a digital image, i.e. a digital representation, of his finger. The digital image of the finger proceeds to an external processor, for instance a personal computer, where it is preprocessed. In the preprocessing, the amount of information in the image is reduced so that, for instance, a binarised image or parts of a binarised image are generated. A corresponding preprocessed image has been stored on the card as a template. The external processor collects the template from the card and compares this with the preprocessed image of the finger. In case of correspondence, the external processor transmits a pin code to the card. This pin code acts as a key and gives access to the sensitive information stored in the memory of the card. If the template and the preprocessed image information do not correspond with each other, no pin code is transmitted and the user cannot access the computer files with the sensitive information on the card.

Even if biometry is used so that the user will not need to use a pin code, a pin code is still transmitted at the last stage of the verification process since this pin code is necessary for the "unlocking" of specific files containing sensitive information on the smart card. Thus the pin code must be hardcoded either in the software for the application which communicates with the card, or in some hardware in the unit where the card is read and written. Consequently no significant increase of the security is achieved despite the use of biometry since there is still a risk that someone may access the computer files with sensitive information on the card by transmitting the pin code to the card.

Also in the case where the only action of the smart card is to generate a yes or no, it is necessary to encrypt the information on the card to be able to guarantee that the yes/no that is transmitted is unique for each card or transmission. This causes the same problems as described above since the key for encryption must be stored somewhere.

A further problem is that the template with which the matching occurs must be read from the card into the external processor in which the comparison with the user's biometric data takes place. In the first place this is a security risk, and in the second place there are directives issued by computer security authorities in certain countries which recommend that a biometric template should never leave the smart card.

One solution to the above problems is presented in Swedish Patent No. 8101707-1 which discloses an account card type data carrier which is provided with verification equipment comprising a sensor on which a user places one of his fingers. The sensor records papillary line information from the user's finger and calculates an identification bit sequence which is compared with a previously stored reference bit sequence. If the bit sequences conform with each other, an acceptance signal is generated, which can activate an indication means or a connecting means which makes the data carrier useable.

Although this solution eliminates the use of pin codes and lets the template remain on the card all the time, certain drawbacks still remain. For example, the card will be relatively expensive to make generally accessible to a large number of users since it contains a large number of components and must be specially made. Owing to the large number of components and the fact that all operations are effected on the card, also the probability increases that the card will meet with interruptions. Furthermore it is difficult to protect the sensor on the card against external mechanical action.

SUMMARY OF THE INVENTION

An object of the present invention therefore is to obviate, or at least alleviate, the above problems and to provide an alternative system for checking the right to access to sensitive information.

According to the invention, this object is achieved by a system which has the features defined in appended claim 1, preferred embodiments being stated in appended claims 2–10. The object is also achieved by a portable data carrier according to claims 11–12, a processing unit according to claims 13–18, and a method according to claims 19–27.

More specifically, the invention concerns a system for checking the right to access to sensitive information, the check being based on current biometric data of a person whose right to access to the sensitive information is to be checked, the system comprising a portable data carrier comprising a memory containing the sensitive information, a signal processing means and a communication means; and a processing unit, which is adapted to receive the current biometric data from the person, comprising a memory, a signal processing means and a communication means. The signal processing means of the processing unit is adapted to preprocess the current biometric data and to transfer the same to the signal processing means of the data carrier with the aid of the communication means, and the signal processing means of the data carrier is adapted to compare the received preprocessed biometric data with biometric reference data stored in advance in the memory of the data carrier to determine whether the right to access to the sensitive information exists.

The expression "sensitive information" should in this context be interpreted in a very wide sense. The sensitive information may be information stored on the actual data carrier in the form of computer files; a "key" which makes it possible to use the data carrier, for example, to open a door of a room and give the user physical access to information of a type other than that which can be stored on the actual data carrier; and different types of so-called digital certificates. By biometric data is meant data representing an individual-specific characteristic of an individual. Examples of such data can be the pattern of the individual's fingers, palm, iris or voice. The data carrier on which the sensitive information is stored may exist in a large number of different embodiments. The only common features that are necessary between the different embodiments are that it should contain a memory, a signal processing means, such as a processor, an FPGA (Field Programmable Gate Array) or an ASIC (Application Specific Integrated Circuit), and a communication means with the aid of which it can communicate with an external processing unit. For the data carrier to be usable in as many situations as possible, it is important for it to be portable, i.e. that a user should be able to carry the data carrier in a simple way without requiring any additional aids.

According to the invention, the data carrier thus is intended for use together with a processing unit containing a signal processing means, which is adapted to preprocess current biometric data of the person who on a certain occasion uses the data carrier together with the processing unit to gain access to the sensitive information. The term preprocessing thus is here used in a wide sense and intends to comprise all types of signal processing on the current biometric data, which has for its purpose to extract a sufficient amount of information from the current biometric data to be able to make a safe comparison with prestored biometric reference data in the memory of the data carrier. The signal processing means of the data carrier is further adapted to make this comparison. By current biometric data is meant that the user must present the biometric data to the system on each occasion when he wishes to gain access to the sensitive information.

By making the check of the right to access on the data carrier, no pin code need be generated in the processing unit and transferred to the data carrier. The preprocessed biometric data is transferred instead, which is much more difficult to counterfeit since it is more complex than an ordinary pin code.

Owing to the preprocessing in the external processing unit, the data carrier can be of an inexpensive standard type, such as a Java card or a MULTOS card, and need not be specially made and contain a large number of components, which is the case of prior art. Only the operating system on the data carrier has access to the biometric reference data and other sensitive information stored thereon. This also implies that the biometric reference data in the memory of the data carrier need not leave the data carrier to be compared with the preprocessed biometric data. The final decision whether the right to access to the sensitive information exists or not is thus made by the operating system on the actual data carrier. This, too, causes a further increase of security.

According to a preferred embodiment, the preprocessed biometric data and the biometric reference data consist of digital representations of an individual-specific parameter. By a digital representation of an individual-specific parameter is meant a recording in digital form of a body-related characteristic which somehow is unique for an individual. Examples of this are a digital image of the pattern on the individuals fingers, palm, iris, or a frequency spectrum of the individual's voice, or some other kind of representation of a unique characteristic related to the individual's body.

Preferably, the digital representations consist of digital images. The digital images can be recorded by means of an optical sensor, a capacitive sensor, or in some other way. The main thing is that the individual-specific information is recorded in the digital image. The advantage of using digital images is that they can quickly and easily be recorded and easily be processed in different ways.

In the case where a digital image constitutes the digital representation, the signal processing means of the processing unit is advantageously, in the preprocessing, adapted to perform a binarisation of the digital image which represents the current biometric data. Each pixel in the digital image which represents the current biometric data has a colour or grey scale value. The binarisation implies that the colour or grey scale values of the pixels are compared with a threshold value. If the value of the pixel is greater than the threshold value, it is converted into white, and if it is smaller than the threshold value, it is converted into black or vice versa. Through this binarisation, the data quantity in the digital image decreases significantly since black and white can be represented by only one bit each instead of a larger number of bits, which is required for a pixel that is grey or has some other colour. Simultaneously, the contours of the image are essentially retained, which represent the biometric data which is specific to the user. The threshold value with which the pixels of the digital image are compared can either be the same for all pixels, or vary between different parts of the digital image.

The purpose of reducing the data quantity in the original digital image in the preprocessing as described above is to obtain a digital image containing a sufficient data quantity to enable a safe comparison on the data carrier. At the same time this comparison should not require too much time.

In a preferred embodiment of the invention, the signal processing means of the data carrier is adapted to carry out a two-dimensional comparison of at least a partial area of the biometric reference data and at least a partial area of the preprocessed biometric data. By a two-dimensional comparison is meant that the signal processing means directly compares areas of the preprocessed biometric data and in the reference data. As a result, no reference point or similar aid need be used in the comparison. To reduce the time expenditure in this comparison, use is advantageously made of partial areas of the two images. A partial area of the image containing the digital reference data is compared successively with different partial areas of the preprocessed image until sufficient correspondence between the partial areas is achieved. Subsequently, additional partial areas of the representation of the digital reference data are compared with the preprocessed biometric reference data until a predetermined comparison criterion has been satisfied. The comparison criterion may vary between different applications, and if it is not satisfied, the biometric reference data is not considered to correspond with the current biometric data. The partial areas used in the comparison may vary in size, form and position. The important thing is that they are selected in such manner that the individual-specific information in the areas will be maximal.

In the case where the digital representation has a format other than a digital image, the preprocessing and the comparison will, of course, be different from the processing and comparison described above. Just as described above, however, the purpose of the preprocessing is to reduce the data quantity in the original digital representation to obtain a digital representation containing a sufficient data quantity to enable a safe comparison on the data carrier.

In one more embodiment, the signal processing means of the data carrier is further adapted to determine, in case of correspondence between the preprocessed biometric data and the biometric reference data, which operations the processing unit is allowed to perform on the sensitive information. When the preprocessed biometric data has once been transferred from the processing unit to the data carrier, the signal processing means of the data carrier thus first makes the final check without involving the signal processing means of the processing unit. If, in this check, it is found that the preprocessed biometric data and the biometric reference data correspond with each other, the signal processing means of the data carrier grant the processing unit certain rights as to which operations it is allowed to perform on the sensitive information. These operations can be, for example, merely reading sensitive information from the memory of the data carrier, making changes in the existing sensitive information in the memory of the data carrier, supplying additional sensitive information to the memory of the data carrier, or various combinations of the above operations.

In the presently most preferred embodiment, the current biometric data consists of a fingerprint, which enables a simple recording process.

According to another aspect, the memory of the data carrier may also preferably contain feature reference data. If a lower security level and a higher verification speed are desired, feature data can instead be used to verify the user's right to use the card. The comparison of features in fingerprints is well known in the art, and this verification process can be designed by a person skilled in the art in a manner that is appropriate for the application at issue.

With a view to increasing the verification speed while at the same time maintaining a high security level, the signal processing means of the processing unit is preferably adapted to extract, in the preprocessing, features from the fingerprint and compare these with feature reference data that has been transferred from the data carrier to the processing unit. As a result, the higher capacity of the signal-processing device in the processing unit can be utilised. The comparison of feature data that is made in the preprocessing may serve various purposes. For instance, by comparing the features it is possible to determine the rotation as well as the translation of the current fingerprint relative to the reference fingerprint. This results on the one hand in improved security and, on the other hand, quicker verification since fewer combinations of rotation and translation need be examined on the data carrier. This verification process can thus be said to constitute a type of "hybrid matching" in which on the one hand a traditional comparison of feature data from the fingerprint is effected and, on the other hand, a two-dimensional comparison of partial areas of the digital images is effected.

The data carrier is a standard type smart card, for example a Java or MULTOS card, i.e. simple, inexpensive types of data carrier which are easy to adjust to different applications and are easy for a user to carry. A standard type smart card containing data about a certain user can thus be used in many different situations since it is just standardised and since the operating system on the card handles the files so that the handling of the files is independent of the application for which the card is used, which is not the case with the prior art data carriers described above.

According to another aspect of the invention, it comprises a portable data carrier having a memory which contains sensitive information, a signal processing means and a communication means. The communication means of the data carrier is adapted to receive preprocessed biometric data from a processing unit and to transfer the same to the signal processing means, which is adapted to compare the received preprocessed biometric data with biometric reference data stored in the memory.

Thus the data carrier is adapted to receive preprocessed biometric data. The data received by the data carrier can represent different individual-specific parameters, for instance of the type described above, and can have different formats. The received biometric data must be some type of data which is preprocessed in a processing unit. It is not sufficient, for example, to place one's finger on the data carrier, but the biometric data must be accessible in an electronically readable format. The preprocessing, however, can be more or less extensive, and the format of the preprocessed data may vary to a great extent depending on the application at issue. The decisive factor for which type of preprocessed data can be received by the data carrier is that it must be of the same type as the biometric reference data stored in the memory of the data carrier, and that the data carrier must have sufficient capacity to be able to at least perform the comparison with the biometric data stored in the memory of the data carrier.

In a preferred embodiment of the data carrier, the signal processing means is adapted to compare the preprocessed biometric data with the biometric reference data by comparing digital representations of an individual-specific parameter. The advantage of using digital representations is evident from the above discussion in connection with the description of the system. The digital representations preferably consist of digital images.

According to one more aspect of the invention, it comprises a processing unit for checking the right to access to sensitive information stored on a portable data carrier, said check being based on current biometric data of an individual, the processing unit comprising a memory, a signal processing means and a communication means. The signal processing means of the processing unit is adapted to preprocess biometric data of the individual and transfer this to the data carrier via the communication means. A number of different types of preprocessing can be carried out depending on the type of current biometric data supplied by the individual. However, the purpose is always to reduce the amount of information in the recorded current biometric data so as to give it a format that allows a transfer to the data carrier and a final comparison on the same. The processing unit can be any type of unit having a memory, a signal processing means and a communication means, and advantageously consists of a computer.

Moreover, the processing unit can be equipped with a sensor for recording current biometric data of the individual in the form of a digital representation, such as a digital image. Thus, no additional equipment need be connected to the processing unit, which means that the recording and preprocessing can be integrated so that the process from the recording of the user's biometric data up to and including the transfer to the portable data carrier will be quick. Furthermore also security increases since current biometric data need not be transferred between a special recording unit and the processing unit. The sensor can also be better protected against mechanical action compared with the case where it is arranged or the actual data carrier.

Preferably, the current biometric data is a fingerprint and the signal processing means of the processing unit is adapted to extract, in the preprocessing, features from the fingerprint and compare these with feature reference data that has been transferred from the data carrier to the processing unit. The purpose of this comparison of features is apparent from the above discussion in connection with the system.

According to a last aspect of the invention, it comprises a method of checking, based on current biometric data of a person, the right to access to sensitive information stored on a portable data carrier. The method comprises the steps of preprocessing the current biometric data in a processing unit;

transferring the preprocessed biometric data to the data carrier;

comparing on the data carrier the preprocessed biometric data with biometric reference data stored on the data carrier; and in case of correspondence between the preprocessed biometric data and the biometric reference data, granting the person the right to access to the sensitive information.

Preferred variants of this method are presented in claims 20–27. These methods result in the same advantages as have been mentioned above in the discussion of the system, the data carrier and the processing unit.

BRIEF DESCRIPTION OF THE DRAWINGS

The invention will now be described in more detail by way of an embodiment with reference to the enclosed schematic drawings.

DESCRIPTION OF PREFERRED EMBODIMENTS

Figure 1:
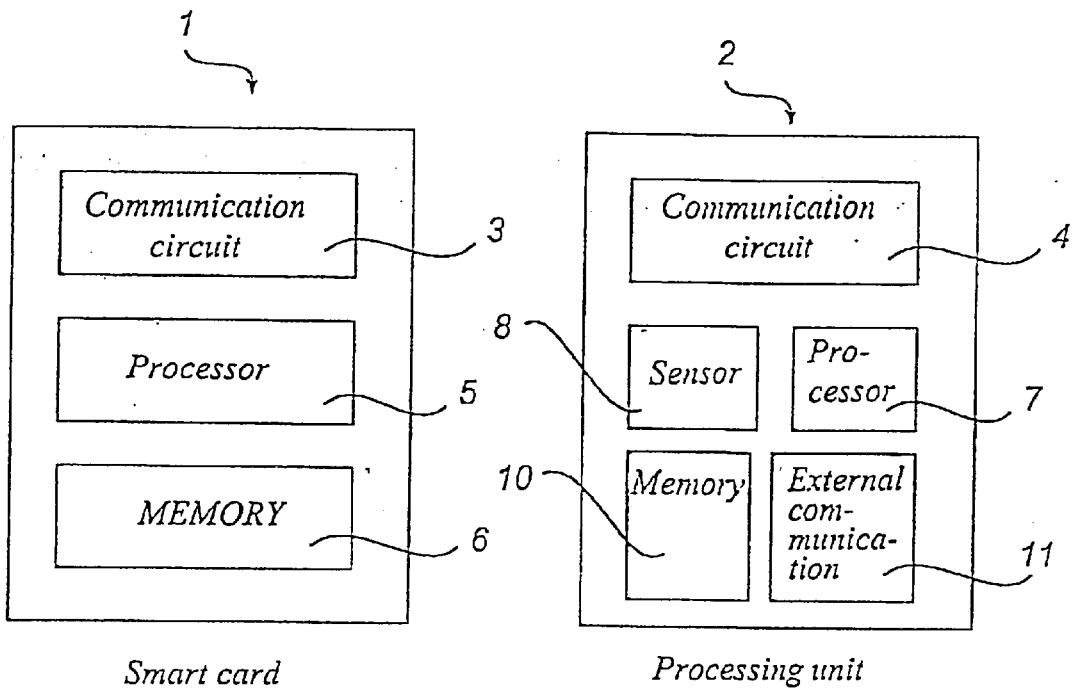
FIG. 1 is a schematic drawing showing a system according to the invention.

FIG. 1 is a schematic view of a system according to the invention, which consists of a data carrier 1 in the form of a smart card and a processing unit 2, which in this case is a computer. The smart card 1 is an ordinary standard type card, for instance a Java or MULTOS card, and has a communication means 3 which is adapted to communicate with a communication means 4 in the commuter 2. The smart card 1 further has a signal-processing unit in the form of a processor 5 and a memory 6. The memory 6 contains sensitive information on the one hand in the form of computer files to which the person using the system wishes to gain access and, on the other hand, in form of a template which consists of biometric reference data of the user. The template consists of a preprocessed digital representation in the form of a digital image, and it will be described below in connection with FIG. 2 how this image is generated. In addition to the sensitive information and the template, the memory 6 also contains software which the processor 5 uses to compare the preprocessed image of the user's biometric data, which has been transferred from the computer 2 to the smart card 1, and the template.

The computer 2 comprises a signal processing means or a processor 7, which is used in the preprocessing of the user's biometric data. The biometric user data is recorded by means of a sensor 8, which in this embodiment consists of a capacitive sensor. However, also other known types of sensors can be used that can record fingerprints, such as heat sensors, or optical sensors. The sensor 8 is connected to the processor 7 and to a memory 10, in which software is stored for the preprocessing of the biometric data that the processor 7 carries out. The computer 2 also comprises circuits 11 for external communication with other units. The communication between the different units in the computer 2 and on the smart card 1, respectively, occurs via a data bus (not shown).

For a comparison to be made on the card 1, it is necessary to produce a template with which the user's biometric data can be compared each time a verification of the right to access to the sensitive information on the card 1 need be made. A description how this is done follows below.

Figure 2:
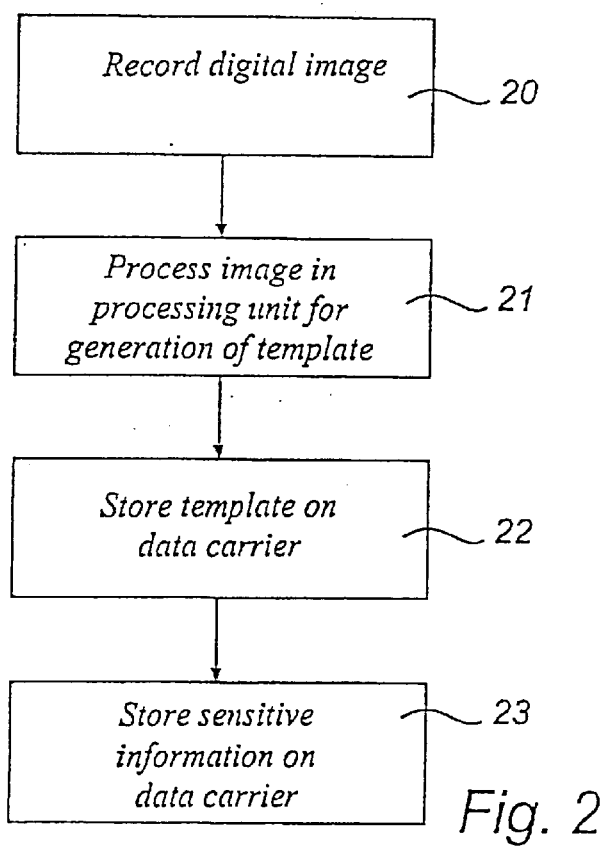
FIG. 2 is a block diagram showing a method according to the invention for recording biometric reference data on a data carrier.

FIG. 2 is a block diagram showing how a template and sensitive information are recorded and stored on the data carrier or smart card 1. In step 20, an image of the user's finger is recorded by means of the sensor 8 in the computer 2. The result of the recording is a digital image in grey scale which represents the user's fingerprint. In step 21, this digital image is preprocessed so as to generate a template. This preprocessing can be carried out in many ways, one of which will be described below.

First, a check of the image quality of the fingerprint is carried out. Among other things, it is checked whether the user has applied his finger with sufficient pressure on the sensor 8 and so that any moisture on the user's finger has not made it impossible for the sensor 8 to distinguish between "crests" and "troughs" on the finger. If the quality of the image is insufficient, the user is requested to correct the deficiencies in a suitable manner.

When a digital image in grey scale of sufficient quality has been recorded by the sensor 8, a binarisation of the image occurs. The binarisation implies that the pixels of the image are compared with a grey scale threshold value. The pixels which have a value smaller than the grey scale threshold value are converted to white and those having a value greater than the grey scale threshold value are converted to black. The grey scale threshold value can be the same for the entire image or vary between different parts of the image. The binarisation algorithm can further be refined, so that the pixels are compared with the surroundings, so as to prevent, for example, individual pixels from being white if all the surrounding pixels are black. This adaptation is easily carried out by a person skilled in the art.

After the binarisation, a number of areas of the image are selected to be stored in the form of a template. One of the areas is selected to be positioned fairly central in the image, and the others, the number of which usually varies between four and eight depending on the desired security level, may have varying positions relative to the central area. The size of the selected areas is in this embodiment 48×48 pixels, but can easily be adjusted by a person skilled in the art according to the existing requirements. The size and position of the various areas are selected so as to comprise as much individual-specific information as possible. For instance, areas with curved lines are of greater interest than areas with straight parallel lines.

Subsequently the template is transferred from the computer 2 via the communication circuits 3, 4 to the memory 6 of the smart card 1 in step 22. When the template has been transferred, sensitive information can also be transferred from the computer 2 and stored in the memory 6 of the smart card 1, step 23, if desired. The recording of templates for the card owner is made only once. The sensitive information can, however, be replaced when necessary.

Figure 3:
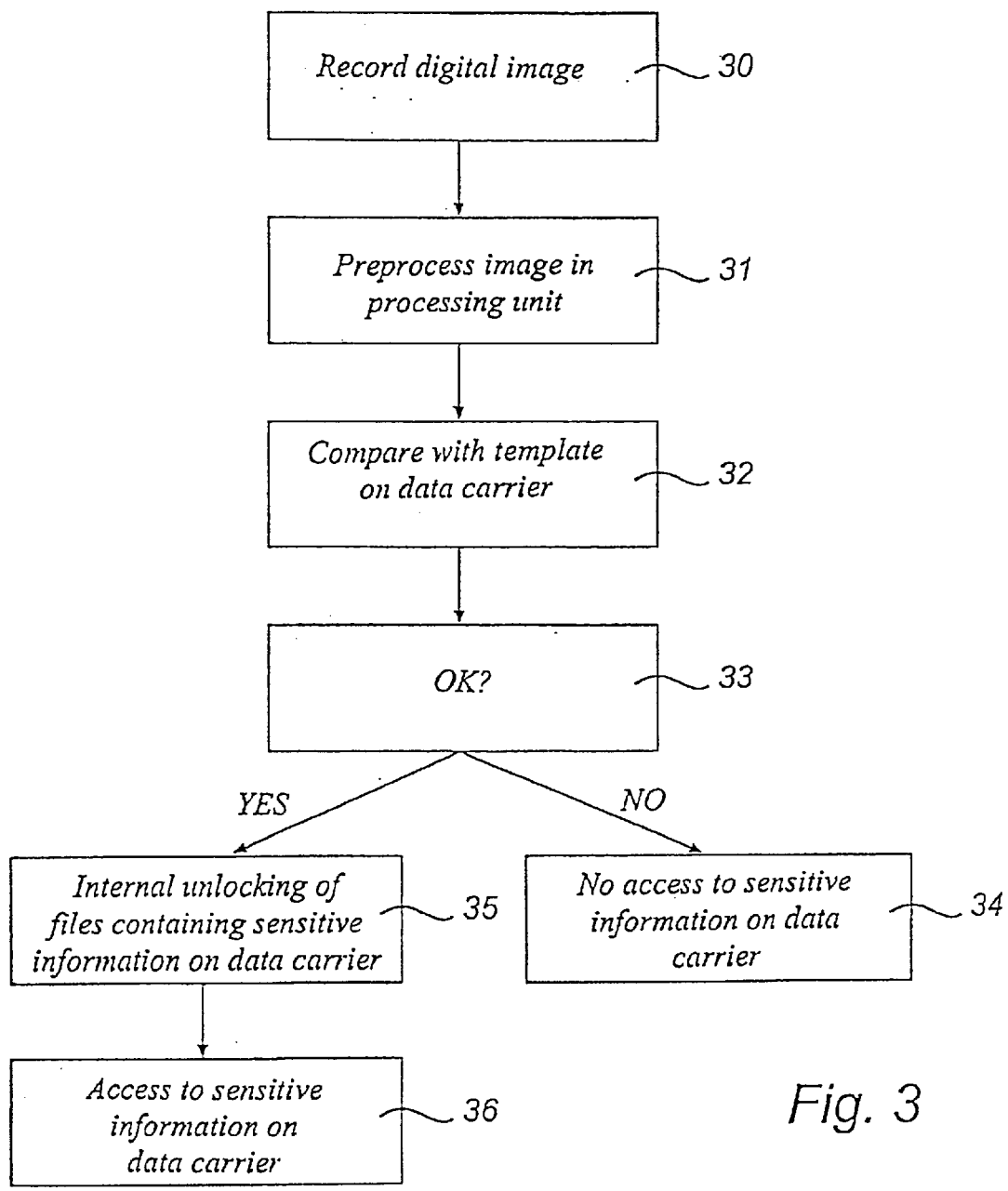
FIG. 3 is a block diagram showing a method according to the invention for checking the right to access to sensitive information stored on a data carrier.

FIG. 3 shows a verification process when a user wants to get hold of the sensitive information stored on the smart card 1. First he places his smart card 1 in a card reader either directly in the computer 2 or in a separate card reader communicating with the computer 2. Fe then places his finger on the sensor 8 and a digital image is recorded in step 30 in the same way as described above. The image is preprocessed in the computer 2 in step 31 in the same way as in the recording of the template, except that no partial areas are selected, so that otherwise it has the same format as the template stored on the smart card 1. Subsequently, the preprocessed image is transferred to the smart card 1 via the communication circuits 3, 4 where it is matched with the template, step 32. In the matching, the central partial area of the template "sweeps" over the preprocessed image and in every position a comparison is carried out pixel by pixel. If a pixel in the template corresponds with a pixel in the preprocessed image, a given value, for example 1, is added to a sum. If the pixels do not correspond, the sum is not increased. When the central partial area of the template has swept over the entire preprocessed image, a position is obtained, where the central partial area of the template best overlaps a partial area of the preprocessed image.

Next, the remaining partial areas of the template are matched with the preprocessed image at issue. This matching is less time-consuming since an approximate position of the remaining partial areas is already known from the recording occasion for the template. When the pixels in the remaining partial areas of the template have been compared with corresponding areas of the preprocessed image, a total match value between 0% (i.e. no match at all) and 100% (i.e. exact match) is obtained. This match value is compared with a predetermined threshold value, step 33. A more exhaustive description of the recording of templates and the verification is to be found in Applicant's International Patent Application No. PCT/SE99/00553.

If the degree of correspondence between the preprocessed image and the template is lower than the threshold value, step 33, the smart card returns a signal to the computer 2 in step 34, which refuses the user access to the sensitive information on the smart card 1, whereupon the process is ended. If, on the other hand, the template and the preprocessed image correspond with each other, the processor 5 of the smart card 1 unlocks the files containing sensitive information, step 35. Then the computer 2 gets access to this information, step 36, and this and other sensitive information can be exchanged between the two units.

Although a special embodiment of the invention has been described above, it is obvious to those skilled in the art that many alternatives, modifications and variations are feasible in the light of the above description. For example, a reference point can be located in the verification to achieve a quicker comparison between the images, and the areas of the image that are selected to be matched can be selected on the basis of other criteria than those described above. Quite different types of biometric data can also be used, such as the user's voice and a digital representation thereof in the form of a frequency spectrum. Therefore the invention is considered to comprise all such alternatives, modifications and variations that are within the scope of the appended claims.

What is claimed is:

1. A system for checking the right to access to information, the checking being based on current fingerprint data of a person whose right to access to the information is to be checked, the system comprising a portable data carrier comprising a signal processing means for processing signals, a communication means for performing communications and a memory containing the information, feature reference data of a fingerprint of a person who has the right to access to the information and fingerprint reference data in the form of a digital representation of at least a partial area of the fingerprint of the person who has the right to access to the information, and a processing unit, which is adapted to receive the current fingerprint data from the person whose right to access to the information is to be checked, comprising a memory, a signal processing means for processing signals and a communication means for communicating, wherein the signal processing means of the processing unit is adapted to pre-process the current fingerprint data, the pre-processing comprising extracting features from the current fingerprint data and comparing them with the feature reference data which has been transferred from the data carrier to the processing unit, and to transfer the pre-processed current fingerprint data to the signal processing means of the data carrier via the communication means of both the data carrier and the processing unit, and wherein the signal processing means of the data carrier is adapted to compare the received pre-processed fingerprint data with the fingerprint reference data stored in advance in the memory of the data carrier to determine whether the right to access to the sensitive information exists.

2. A system as claimed in claim 1, wherein the pre-processed fingerprint data and the fingerprint reference data consist of digital images.

3. A system as claimed in claim 2, wherein the signal processing means of the processing unit is, in the pre-processing, adapted to perform a binarisation of the digital image representing the current fingerprint data.

4. A system as claimed in claim 1, wherein the signal processing means of the data carrier is adapted to perform a two-dimensional comparison of said at least a partial area of the fingerprint of the person who has the right to access to the sensitive information and at least a partial area of the pre-processed fingerprint data.

5. A system as claimed in claim 1, wherein the signal processing means of the data carrier is further adapted to determine, in case of correspondence between the pre-processed fingerprint data and the fingerprint reference data, which operations the processing unit is allowed to carry out on the sensitive information.

6. A system as claimed in claim 1, wherein the data carrier is a smart card.

7. A system as claimed in claim 1, wherein the signal processing means of the processing unit is adapted to determine the rotation as well as the translation of the current fingerprint data relative to the fingerprint reference data.

8. A portable data carrier comprising a signal processing means for processing signals, a communication means for communicating and a memory containing sensitive information, feature reference data for a fingerprint of a person, who has the right to access to the sensitive information, and fingerprint reference data in the form of a digital representation of at least a partial area of the fingerprint of the person who has the right to access to the sensitive information; wherein the signal processing means is adapted to transfer the feature reference data to a processing unit for pre-processing of current fingerprint data for a person whose right to access to the sensitive information is to be checked; wherein the communication means is adapted to receive the pre-processed current fingerprint data from the processing unit and transfer the same to the signal processing means; and wherein the signal processing means is adapted to compare the received pre-processed current fingerprint data with the fingerprint reference data stored in the memory to determine whether the right to access to the sensitive information exists.

9. A portable data carrier according to claim 8, wherein the signal processing unit is adapted to perform a two-dimensional comparison of said at least a partial area of the fingerprint of the person who has the right to access to the sensitive information and at least a partial area of the pre-processed current fingerprint data.

10. A portable data carrier according to claim 9, wherein the data carrier is a smart card.

11. A portable data carrier according to claim 8, wherein the data carrier is a smart card.

12. A processing unit for use when checking the right to access to sensitive information stored on a portable data carrier, said checking being based on current fingerprint data of a person whose right to access to the sensitive information is to be checked, the processing unit, which is adapted to receive the current fingerprint data, comprising a memory, a signal processing means for processing signals and a communication means for communicating; wherein the signal processing means is adapted to pre-process the current fingerprint data, the pre-processing comprising extracting features from the current fingerprint data and comparing them with feature reference data for a fingerprint of a person who has the right to access to the sensitive information, which feature reference data has been transferred from a data carrier to the processing unit, and to transfer the pre-processed current fingerprint data, which comprises a digital image of a fingerprint of the person whose right to access to the sensitive information is to be checked, to the data carrier, where the pre-processed current fingerprint data is to be compared with fingerprint reference data stored on the data carrier in order to determine whether the right to access to the sensitive information exists.

13. A processing unit as claimed in claim 12, wherein the signal processing means is further adapted to perform operations on the sensitive information, based on rights assigned to the processing unit by the data carrier.

14. A processing unit as claimed in claim 13, wherein the processing unit is further provided with a sensor for recording the current fingerprint data of the person, whose right to access to the sensitive information is to be checked, in the form of a digital representation.

15. A processing unit as claimed in claim 12, wherein the processing unit is further provided with a sensor for recording the current fingerprint data of the person, whose right to access to the sensitive information is to be checked, in the form of a digital representation.

16. A processing unit as claimed in claim 15, wherein the digital representation is a digital image.

17. A processing unit as claimed in claim 16, wherein the signal processing means in the pre-processing is adapted to carry out a binarisation of the digital image which represents the current fingerprint data.

18. A processing unit as claimed in claim 12, wherein the signal processing means is adapted to determine the rotation as well as the translation of the current fingerprint data relative to the fingerprint reference data.

19. A method of checking the right to access to sensitive information, stored on a portable data carrier, the checking being based on current fingerprint data of a person, whose right to access to sensitive information is to be checked, comprising the steps of receiving, in a processing unit, the current fingerprint data from the person whose right to access to sensitive information is to be checked;

receiving, in the processing unit, from the data carrier, feature reference data for a fingerprint for a person who has the right to access to the sensitive information;

pre-processing, in the processing unit, the current biometric data, said pre-processing comprising extracting features from the current fingerprint data and comparing them with the feature reference data;

transferring the pre-processed fingerprint data from the processing unit to the data carrier;

comparing, on the data carrier, the pre-processed fingerprint data with fingerprint reference data stored on the data carrier in the form of a digital representation of at least a partial area of the fingerprint of the person who has a right to access to the sensitive information; and in case of correspondence between the pre-processed fingerprint data and the fingerprint reference data, granting access to the sensitive information.

20. A method as claimed in claim 19, further comprising the step of determining, with the aid of signal processing means of the data carrier, which operations the processing unit is allowed to perform on the sensitive information in case of correspondence between the pre-processed fingerprint data and the fingerprint reference data.

21. A method as claimed in claim 20, further comprising the step of recording, by means of the processing unit, the current fingerprint data of the person whose right to access to the sensitive information is to be checked.

22. A method as claimed in claim 19, further comprising the step of recording, by means of the processing unit, the current fingerprint data of the person whose right to access to the sensitive information is to be checked.

23. A method as claimed in claim 19, wherein the step of comparing the transferred pre-processed fingerprint data with the fingerprint reference data comprises the step of comparing two digital representations.

24. A method as claimed in claim 23, wherein the digital representations are digital images.

25. A method as claimed in claim 24, wherein the step of pre-processing the current fingerprint data in the processing unit comprises the step of binarising the digital image which represents the current fingerprint data.

26. A method as claimed in claim 19, wherein the step of comparing the pre-processed fingerprint data with fingerprint reference data comprises the step of carrying out a two-dimensional comparison of said at least a partial area of the digital representation of the fingerprint of the person who has the right to access to the sensitive information and at least a partial area of the pre-processed fingerprint data.

27. A method as claimed in claim 19, further comprising the step of determining, in the processing unit, the rotation as well as the translation of the current fingerprint data relative to the fingerprint reference data.

28. A method in a portable data carrier for checking the right to access to sensitive information stored in a memory of the data carrier, comprising the steps of transferring feature reference data of a fingerprint of a person who has the right to access to the sensitive information from the data carrier to a processing unit for pre-processing of current fingerprint data from a person, whose right to access to the sensitive data is to be checked;

comparing the received pre-processed current fingerprint data with fingerprint reference data stored in a memory on the data carrier in the form of a digital representation of at least a partial area of the fingerprint of the person who has the right to access to the sensitive information; and determining whether the right to access to the sensitive information exists.

29. A method as claimed in claim 28, wherein the step of comparing comprises performing a two-dimensional comparison of said at least a partial area of the fingerprint of the person who has the right to access the sensitive information and at least a partial area of the pre-processed fingerprint data.

30. A computer program, comprising program code, which when executed in a processor, performs the steps of the method according to claim 29.

31. A computer program, comprising program code, which when executed in a processor, performs the steps of the method according to claim 28.

32. A method in a processing unit in connection with the checking of right to access to sensitive information, stored on a portable data carrier, the checking being based on current fingerprint data of a person, whose right to access to sensitive information is to be checked, comprising the steps of receiving the current fingerprint data from the person whose right to access to sensitive information is to be checked;

receiving from the data carrier, feature reference data for a fingerprint for a person who has the right to access to the sensitive information;

pre-processing the current fingerprint data, said pre-processing comprising extracting features from the current fingerprint data and comparing them with the feature reference data; and transferring the pre-processed current fingerprint data, which comprises a digital image of the fingerprint of the person whose right to access is to be checked, to the data carrier, where the pre-processed current fingerprint data is to be compared with reference fingerprint data stored on the data carrier in order to determine whether the right to access to the sensitive information exists.

33. A method according to claim 32, further comprising the step of determining the rotation as well as the translation of the current fingerprint data relative to the fingerprint reference data.

34. A computer program, comprising program code, which when executed in a processor, performs the steps of the method according to claim 33.

35. A computer program, comprising program code, which when executed in a processor, performs the steps of the method according to claim 32.

\* \* \* \* \*